UNITED STATES PATENT OFFICE.

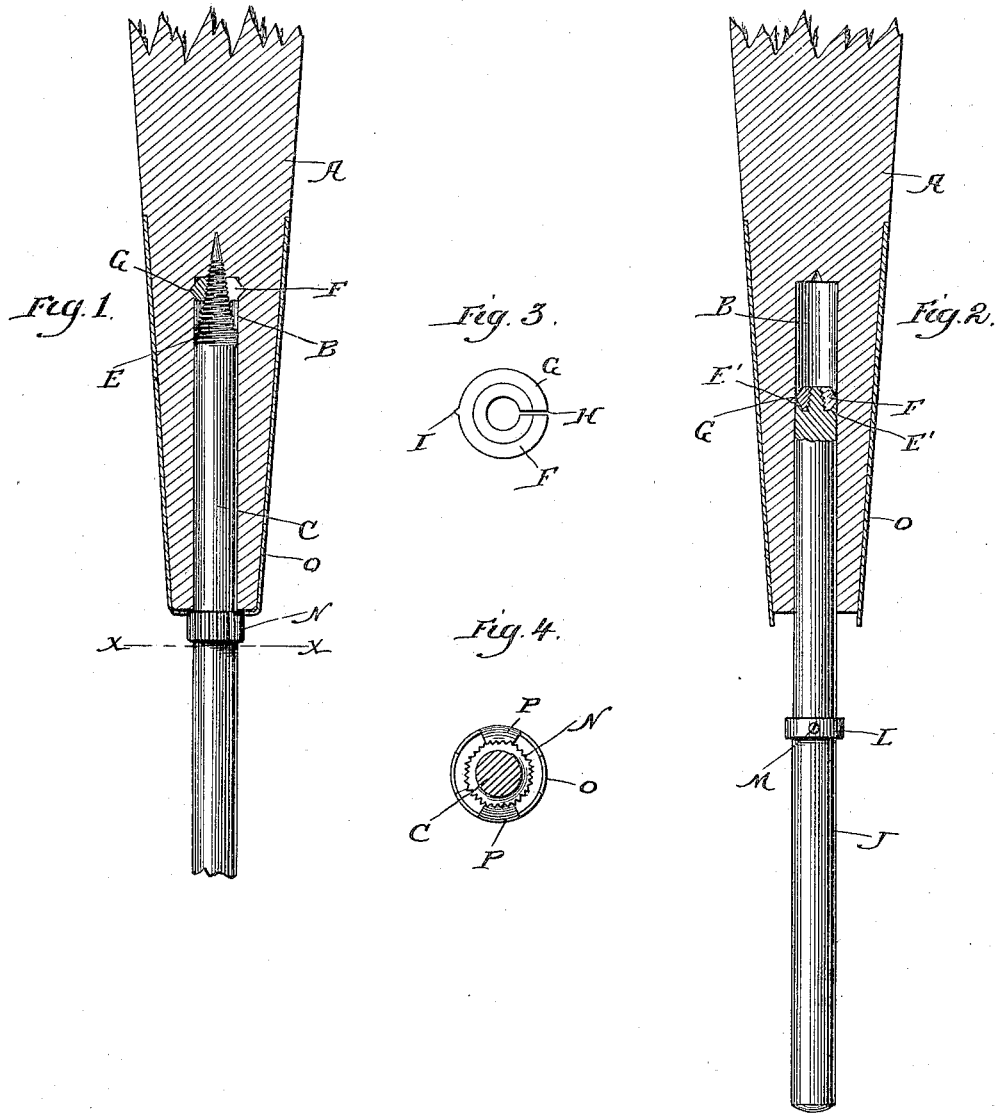

THOMAS E. WILSON, OF FARMLAND, INDIANA.

HANDLE-FASTENER OR SHANK-LOCK.

SPECIFICATION forming part of Letters Patent No. 604,510, dated May 24, 1898.

Application filed November 18, 1897. Serial No. 658,947. (No model.)

*To all whom it may concern:*

Be it known that I, THOMAS E. WILSON, a citizen of the United States, residing at Farmland, in the county of Randolph and State of Indiana, have invented a certain new and useful Improvement in Handle-Fasteners or Shank-Locks, of which the following is a specification.

My present invention relates to a new and useful improvement in handle-fasteners or shank-locks, and has for its object to improve upon the construction shown in Patent No. 585,857, granted to me by the United States Patent Office upon the 6th day of July, 1897, and this improved construction enables the split nut to form its own recess within the handle-shank hole; and a further object of my invention is to prevent the turning of the tool within the handle without the use of a key, thereby both simplifying and cheapening the device and rendering its action more positive and reliable.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a section of a portion of the handle, having a tool fitted thereto in accordance with my improvement; Fig. 2, a representation of a mandrel for forcing the split nut into place; Fig. 3, a detail of the split nut used in my improvement, and Fig. 4 a section at the line *x x* of Fig. 1.

In carrying out my invention as here embodied, A represents the handle of the tool, which has formed therein in any suitable manner a hole B of sufficient length to receive the shank of a tool.

C represents a tool-shank, which is round in cross-section and adapted to pass within the hole B, and the end of this shank is tapered and threaded, as indicated at E, for the purpose hereinafter set forth.

A nut F, having a wedge-shaped periphery, so as to produce a sharp edge G, is provided, and this nut is split, as indicated at H, and has a tapering hole therein, which is threaded to approximately correspond to the tapered threaded end of the shank, so that when the shank is run within this nut past a certain limit a tendency will exist to spread the nut, and this tendency is permitted to bring about such a result, so that when the nut is once in position at the bottom of the hole B the insertion of the tapered end of the shank will expand the same, so as to force its perimeter outward against the side walls of the hole, and an irregularity or projection I may be provided for engaging with the side walls of the hole, thus preventing the nut from turning upon its axis while being expanded.

Prior to the nut being forced within the hole it is run upon the mandrel J sufficiently to bring it in firm contact with the shoulder E' in order that the nut may be readily pushed into the hole without stripping the threads of the mandrel or the nut, it being noted that the end of the mandrel is provided with a short screw threaded just sufficiently to hold the nut thereon while being forced in the handle.

In order that proper depth shall be given to the nut without care upon the part of the operator, a gage-collar L is fitted upon the mandrel and may be secured in any adjustment by the set-screw M, so that by properly adjusting this collar it will come in contact with the end of the handle when the nut is in proper position, as will be readily understood.

After the nut has been placed within the handle and the mandrel is withdrawn the tool may then be passed within the hole and run within the nut sufficiently to expand the same, thus securely holding both the shank and nut in place.

The tool-shank is provided with a collar N, which has longitudinal corrugations formed thereon, and the ferrule O, which is secured upon the handle, has extensions or ears P formed therewith, which have their ends notched, so that when the tool-shank has been secured in place by its threaded end being screwed within the nut said shank may be prevented from rotating by turning the extensions or ears P inwardly, so that the serrated ends thereof will engage the corrugations of the collar N, as is clearly shown in Fig. 4.

From this description it will be obvious that when a tool is to be secured to a handle it is only necessary to run the threaded end thereof into the nut within the hole sufficiently to extend said nut firmly within its recess, and then force the corrugations of the ferrule against the corrugations of the shoulder, after which the tool cannot by any possibility become accidentally disengaged from the handle, nor can it revolve upon its axis, thus giving a complete fastening for the tool which in no way interferes with the grasping of the handle or operation of the device. Now should it become necessary to remove the tool from the handle and substitute another therefor it is only necessary to force the corrugations P outward, so as to free the shoulder, after which the tool may be easily revolved upon its axis until its threaded end is disengaged from the split nut, and thus be free for removal from the handle, a reverse operation taking place to substitute another tool.

My improvement is well adapted for all classes of tools having shanks—such as pitchforks, hoes, rakes, knives, &c.—and is especially adapted for that class known as "interchangeable" tools, or for those which it often becomes desirable to remove the handle therefrom in replacing a broken tool by a new one, and the principal advantage of my improvement is its exceeding simplicity, the small cost, and the fact that it may be manipulated by a person of little or no skill.

Having thus fully described my invention, what I claim as new and useful is—

1. In combination, a tool-handle having a hole therein, a split nut having internal screw-threads, a tool-shank having a tapered threaded end for engagement with the threads of the nut whereby when the shank is rotated the nut will be expanded, said shank having longitudinal corrugations thereon, and a ferrule having extensions which are corrugated at their ends to engage the corrugations of the shank, as and for the purpose described.

2. In combination with a threaded split nut of a tool-shank having a tapered threaded end adapted to engage the threads of the nut, a shoulder formed upon said shank having notched or corrugated sides, a ferrule secured upon the handle, said ferrule having extensions formed therewith, the ends thereof being serrated to engage the notches or corrugations of the shoulder, as and for the purpose described.

In testimony whereof I have hereunto affixed my signature in the presence of two subscribing witnesses.

THOMAS E. WILSON.

Witnesses:
I. T. KARNS,
F. G. CONNER.